United States Patent [19]

Larsen

[11] Patent Number: 5,684,570
[45] Date of Patent: Nov. 4, 1997

[54] METHOD AND APPARATUS FOR MANIPULATION OF LARGE FORMAT MEDIA SUPPLY CASSETTES

[75] Inventor: David B. Larsen, Woburn, Mass.

[73] Assignee: Agfa Division, Bayer Corporation, Wilmington, Mass.

[21] Appl. No.: 329,030

[22] Filed: Oct. 25, 1994

[51] Int. Cl.⁶ ............................................. G03B 27/58
[52] U.S. Cl. .................................................. 355/72
[58] Field of Search ................ 355/72, 309; 101/232; 271/162

[56] References Cited

U.S. PATENT DOCUMENTS

| | | | |
|---|---|---|---|
| 4,135,805 | 1/1979 | Taylor et al. | 355/308 |
| 4,218,135 | 8/1980 | Tsuda et al. | 355/72 |
| 5,132,725 | 7/1992 | Findeis et al. | 355/72 |
| 5,187,531 | 2/1993 | Ozawa et al. | 355/308 |
| 5,335,045 | 8/1994 | Kunz et al. | 355/72 |
| 5,362,008 | 11/1994 | Nagel et al. | 242/417 |

*Primary Examiner*—Fred L. Braun
*Attorney, Agent, or Firm*—Julie A. Krolikowski

[57] ABSTRACT

A cassette handling mechanism is used to remove, reload and reinstall a media supply cassette into a media transport unit. The cassette is supported by a sliding support tray in a horizontal docking position. A locking device on the support tray engages the bottom of the cassette allowing the cassette to be pivoted into several different orientations. The support tray slides out horizontally from the media transport unit, allowing the operator to either lift the cassette vertically without releasing the lock, to actuate the lock thereby pivoting the cassette to an intermediate detent position in which the media can be reloaded, or to pivot the cassette to a 90 degree detent position releasing the cassette on its side onto an optional shelf or roll-up table. The locking mechanism 50 is used on a second support tray which is supported by a counterbalanced pivotable arm, to extract a second cassette docked in a non-horizontal position within the media transport unit. The arms rotate the cassette into the intermediate position without use of the locking device allowing reloading of the media. Actuating the lock pivots the cassette to the 90 degree position where the cassette may be placed onto the optional shelf or roll-up table.

19 Claims, 5 Drawing Sheets

METHOD AND APPARATUS FOR MANIPULATION OF LARGE FORMAT MEDIA SUPPLY CASSETTES

BACKGROUND OF THE INVENTION

The invention is related to media supply cassette handling, and more specifically to installation and removal of large format media supply cassettes used in imagesetters.

Imagesetters typically have a supply roll of photosensitive media in a light-safe supply cassette, a recording support surface, and an image scanning system for scanning an image onto the media. The media passes from the supply roll supported in the supply cassette, to the recording support surface where the photosensitive media is exposed by the image scanning system. The exposed media is transported in web form into a take-up cassette for storage in a light-safe environment. Otherwise, the media is transported by a conveyor directly from the imagesetter to a processor for developing. When the supply roll runs out or when the operator requires a different media type for imaging, the supply cassette is removed by the operator and reloaded with a new supply roll, or replaced by another media supply cassette containing the different media type.

Large format media supply cassettes are relatively bulky and heavy for manual manipulation, as typically they can accommodate supply rolls 36 inches in width, for example. A fully loaded supply cassette can range in weight from approximately 30 to 60 pounds, depending on the width of the media and the construction material of the supply cassette. Manual loading and installation of the large format media into an imagesetter usually requires two operators due to the bulk and weight of the loaded supply cassette. It is desirable to assist a single operator so as to easily manipulate such large format supply cassettes during installation and removal to increase productivity.

It is accordingly a general object of the present invention to assist an imagesetter operator with large format media supply cassette reloading, installation and removal.

It is another object of the invention to allow a single operator to install, remove and reload a media supply cassette without requiring any lifting of the supply cassette by the operator.

It is yet another object of the invention to facilitate reloading or removal of a supply cassette from an imagesetter while another supply cassette is in use by the imagesetter.

It is a specific object of the invention to provide an assist mechanism to pivot a large format media supply cassette from an upper docked position to a lower access position and to counterbalance the assist mechanism that performs the pivoting of the supply cassette between the docked position to the access position.

SUMMARY OF THE INVENTION

The invention is an apparatus and method for installation, removal and reloading of a media supply cassette in an imagesetter. The media supply cassette contains a media supply roll and the media supply cassette is supported by a movable support in the imagesetter. The movable support has two functional positions, an operational position in which the media supply cassette supplies media to the imagesetter, and an access position in which the media supply cassette is easily accessible for reloading the media supply cassette with a media supply roll. The access position is also for installing and removing the media supply cassette to and from the movable support. Loading a media supply cassette into the imagesetter involves first installing a media supply cassette onto the movable support in the imagesetter while the movable support is in the access position; automatically securing the media supply cassette to the movable support with a locking mechanism; positioning the movable support from the access position to the operational position with the media supply cassette secured to the movable support, and supplying media from the media supply roll contained in the media supply cassette to the imagesetter.

A supply cassette positioning apparatus positions a first supply cassette containing a first roll of web material and a second supply cassette containing a second roll of web material. A first movable support for supporting the first supply cassette is movable between a first position and a second position. The first position supports the first supply cassette in an operational position in which the material is drawn from the first roll of web material, and the second position supports the first supply cassette in an access position in which the first supply cassette can be reloaded with a new roll of web material while the first supply cassette is supported by the first movable support and in which the first supply cassette can be removed from the first movable support. A second movable support for supporting the second supply cassette is movable between a first position and a second position. The first position supports the second supply cassette in an operating position in which the material is drawn from the second roll of web material, and the second position supports the second supply cassette in an access position in which the second supply cassette can be reloaded with a new roll of web material while the second supply cassette is supported by the second movable support and in which the second supply cassette can be removed from the second movable support.

BRIEF DESCRIPTION OF THE DRAWINGS

The features and objects of the invention will become apparent in the following description taken with the accompanying drawings, in which.

DETAILED DESCRIPTION OF THE INVENTION

Figure 1:
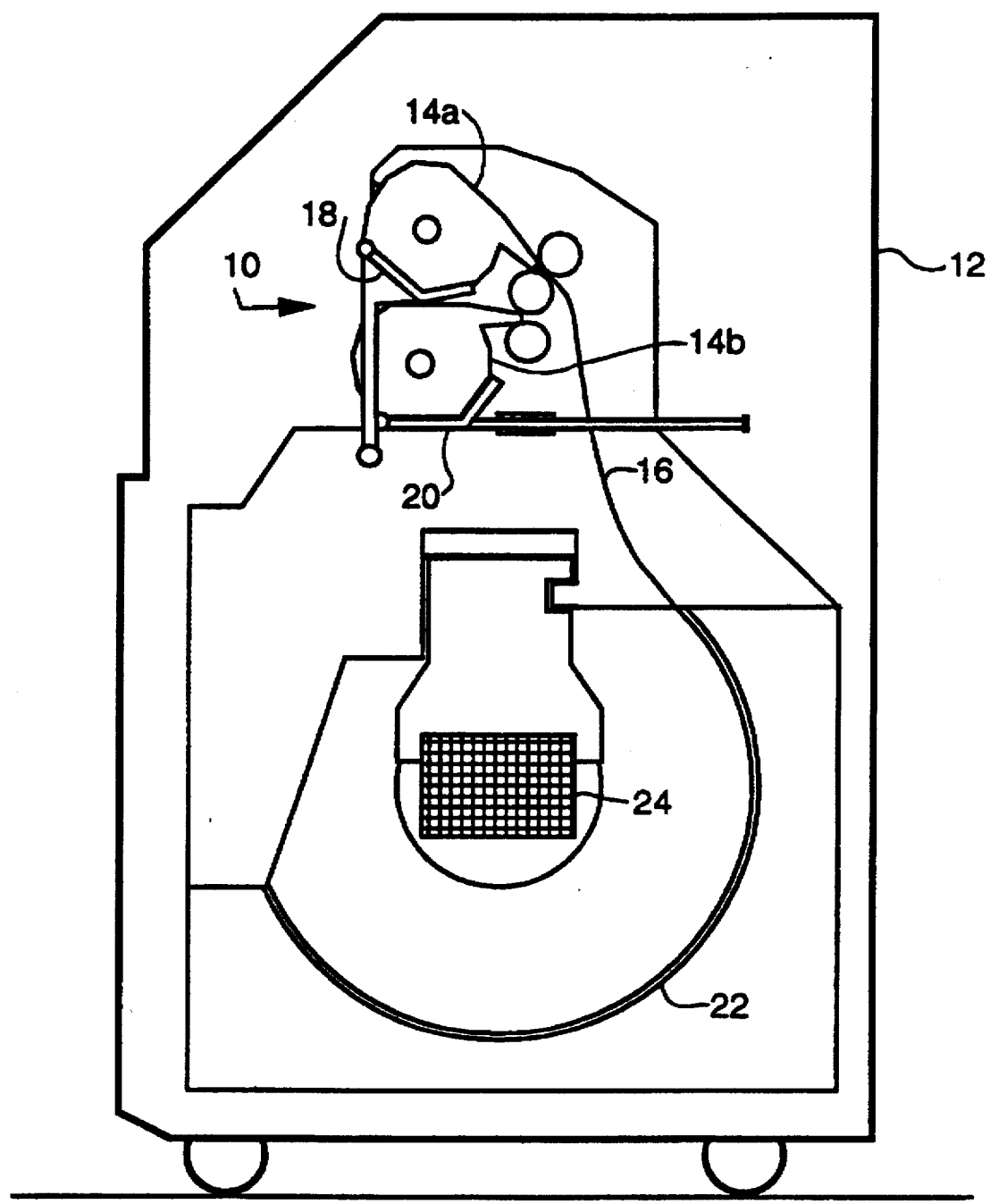
FIG. 1 is an illustrative side view of an imagesetter employing a media supply cassette positioning system according to the invention.

A supply cassette positioning system shown in FIG. 1 is generally indicated by reference numeral 10. The system 10 is mounted within an imagesetter 12 and is shown supporting two media supply cassettes 14a, 14b which contain rolls of photographic media 16 or other image recording material such as paper, lithographic plate, etc. in web form. The media supply cassettes 14a, 14b are supported by an upper support tray 18 and a lower support tray 20, respectively. The imagesetter 12 has two media supply docking locations to allow the imagesetter operator to select from either supply cassette 14a, 14b which can contain the same types of media, different types of media, or different widths or thicknesses of media. A scanning support surface 22 is provided, in this embodiment as an internal drum, for supporting the media 16 drawn out from one of the supply cassettes supported in the docking locations. An image scanning apparatus 24 is located above the drum 22 for scanning an image with a modulated energy source (not shown) onto the media 16 supported by the drum 22.

Figure 2:
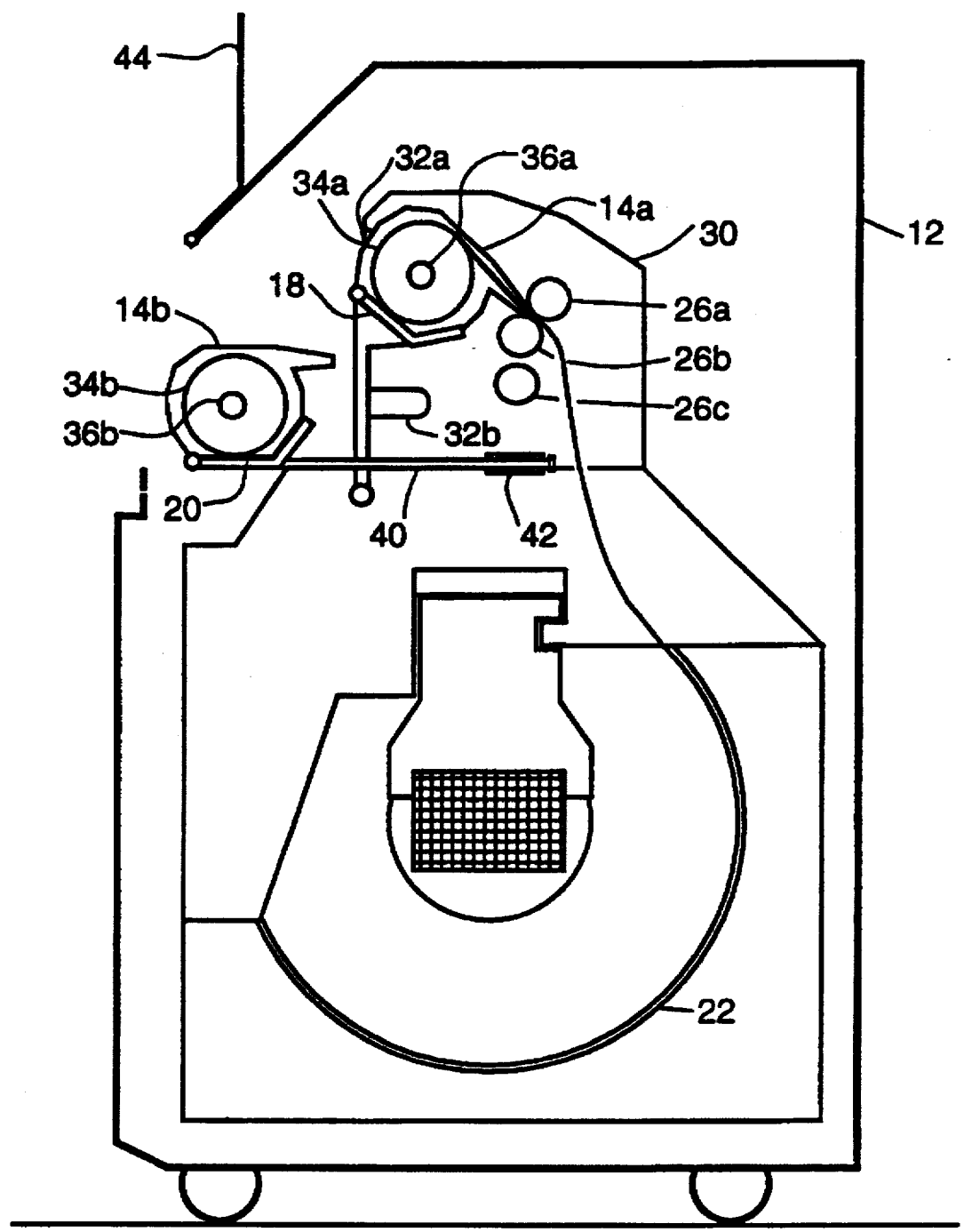
FIG. 2 is an illustrative side view of the imagesetter in FIG. 1 showing a lower supply cassette positioned in an access position by means of the media supply cassette positioning system according to the invention.

Referring to FIG. 2, the supply cassette positioning system is shown having the upper support tray 18 and cassette 14a in the docked, operational position and the lower support tray 20 and supply cassette 14b in a non-operational, access position. The upper support tray 18 in the operational position has the supply cassette positioned at the feed rollers 26a, 26b. The feed rollers 26a, 26c are driven by conventional means to advance and lead the media 16 from the supply cassette to the scanning support surface 22. The middle feed roller 26b is movable between the driven rollers 26a, 26c to cooperate with the driven roller 26a adjacent to the media supply cassette in use 14a.

Support plates 30 are perpendicular to the longitudinal axes of the supply cassettes 14a, 14b and of the feed rollers 26a,b,c and are located at the ends thereof to support the feed rollers 26a,b,c for rotation. Positioning guides 32a, 32b are provided in the support plates 30 to mount the supply cassettes 14a, 14b into their respective docked locations at the feed rollers 26a,b,c. Each supply roll 34a, 34b contained in the supply cassettes 14a, 14b is supported by a spindle 36a, 36b which is inserted through the core of the supply roll. The ends of the spindles 36a, 36b extend through the ends of the supply cassette 14a, 14b and are received by the guides 32a, 32b, respectively, of the support plates 30 to guide the cassettes 14a, 14b into position at the feed rollers 26a,b,c.

The lower support tray 20 is fixed to two laterally spaced rods 40 (one shown) which slide linearly with respect to the positioning guides 32b. Each rod 40 is slideably supported by at least one linear bearing 42, allowing the lower support tray 20 to be pulled out manually by the operator from the operational position at the feed rollers 26a,b,c, to the access position shown in FIG. 2 in which the cassette 14b can be opened and reloaded with another supply roll of media or the cassette 14b can be removed from the support tray 20 and the imagesetter. The imagesetter has covers 44 which open allowing the operator to access the media supply area of the imagesetter.

Figure 3:
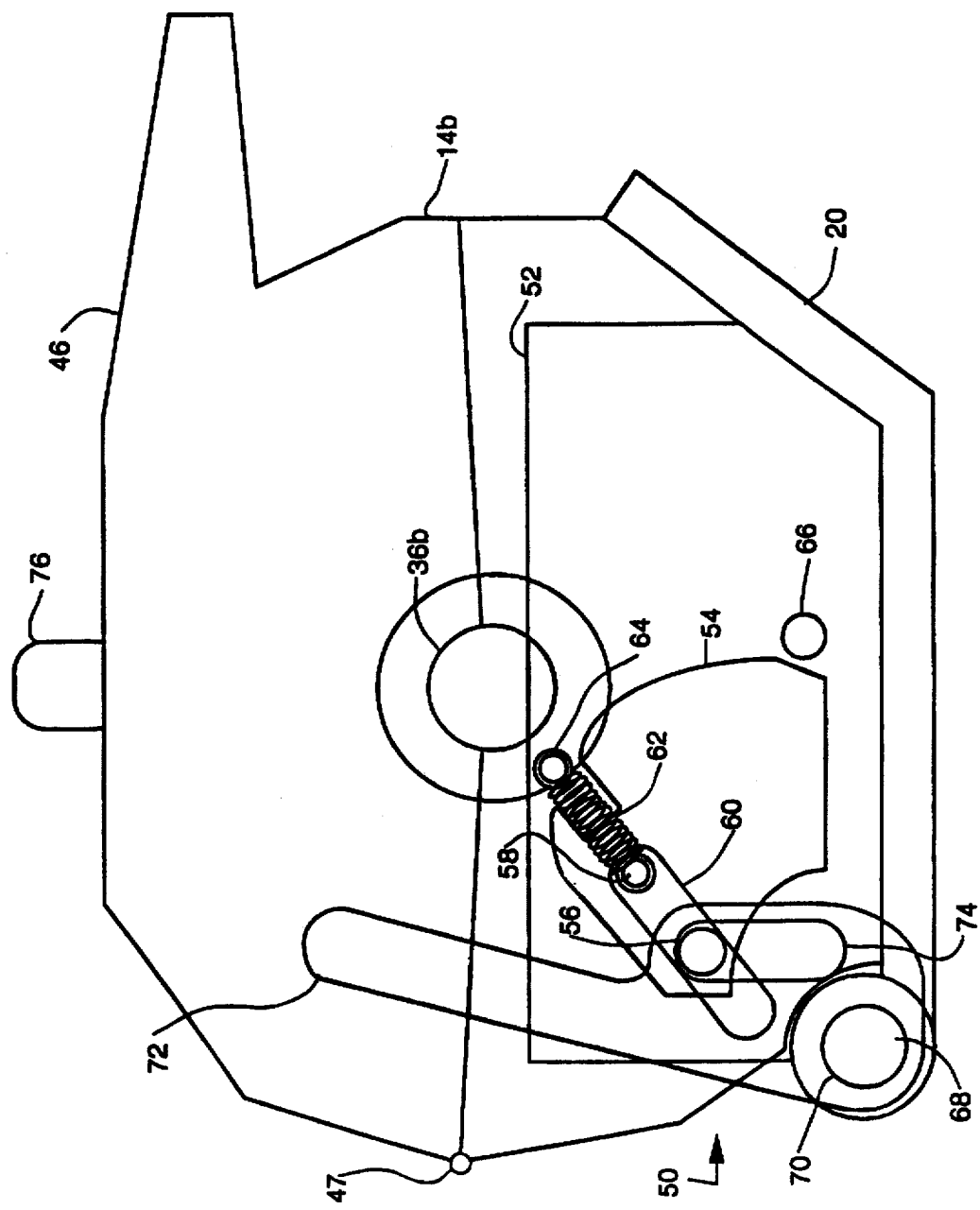
FIG. 3 is an illustrative side view of a media supply cassette secured to a support tray of the media supply cassette positioning system by a locking mechanism.

Referring to FIG. 3, it can be seen the supply cassette has a lid 46 which can be opened about hinge 47 to access the media supply. The lid and lower portion of the supply cassette have a bore formed therein to accommodate the spindle such that the lid can open and closed around the spindle ends. A locking mechanism, generally indicated by reference numeral 50, is located at each end of the support tray 20 to secure the cassette 14b in several different orientations with respect to the support tray 20. The locking mechanism 50 is mounted to the end bracket 52 secured to the end of the support tray 20. A sliding member 54 is supported by the bracket 52 between the end of the supply cassette and the bracket 52. The sliding member 54 has two pins 56, 58 cooperating with a slot 60 provided in the bracket 52 to guide the movement of the sliding member 54. The pins 56, 58 pass through the bracket slot 60 to the opposite side of the bracket 52 where a spring 62 is attached to the pin 58 on the sliding member 54 and to another pin 64 on the bracket 52. The spring 62 urges the sliding member 54 into engagement with a locking pin 66 to lock the supply cassette 14b into the support tray 20. A rotatable shaft 68 mounted through a bore 70 in the front of the support tray 20 extends past the end bracket 52. A lever 72 is attached on each end of the shaft 68 to enable the operator to actuate the locking mechanism 50 from either end of the support tray 20. The lever 72 has a slot 74 which the pin 56 on the sliding member 54 also passes through. Upon pivoting the lever 72 and the rotatable shaft 68, the sliding member 54 is pulled downward and forward by engagement of the pin 56 in the lever slot 74 and the bracket slot 60. When the sliding member 54 is retracted by the lever 72, the locking pin 66 becomes disengaged from the sliding member 54 and the supply cassette 14b is free to be lifted or rotated out of the support tray 20. The bottom of the supply cassette 14b is fully supported within the support tray 20 and the locking pin 66 is engaged with the locking mechanism 50. A handle 76 is provided on the top of the supply cassette 14b to facilitate removal of the cassette 14b from the support tray 20. With the support tray 20 in the access position, the cassette 14b can be removed from the support tray by lifting the cassette 14b vertically. It is not necessary to actuate the lever 72 to retract the sliding member 54 because the locking pin 66 overcomes the sliding member 54 by a slight forward movement of the cassette (to the fight in FIG. 3) while lifting in a generally vertical direction. Replacement of the cassette 14b into the support tray 20 in a downward vertical direction also does not require the lever 72 to be actuated for the locking pin 66 to engage the locking mechanism 50 and secure the cassette for docking.

Figure 4:
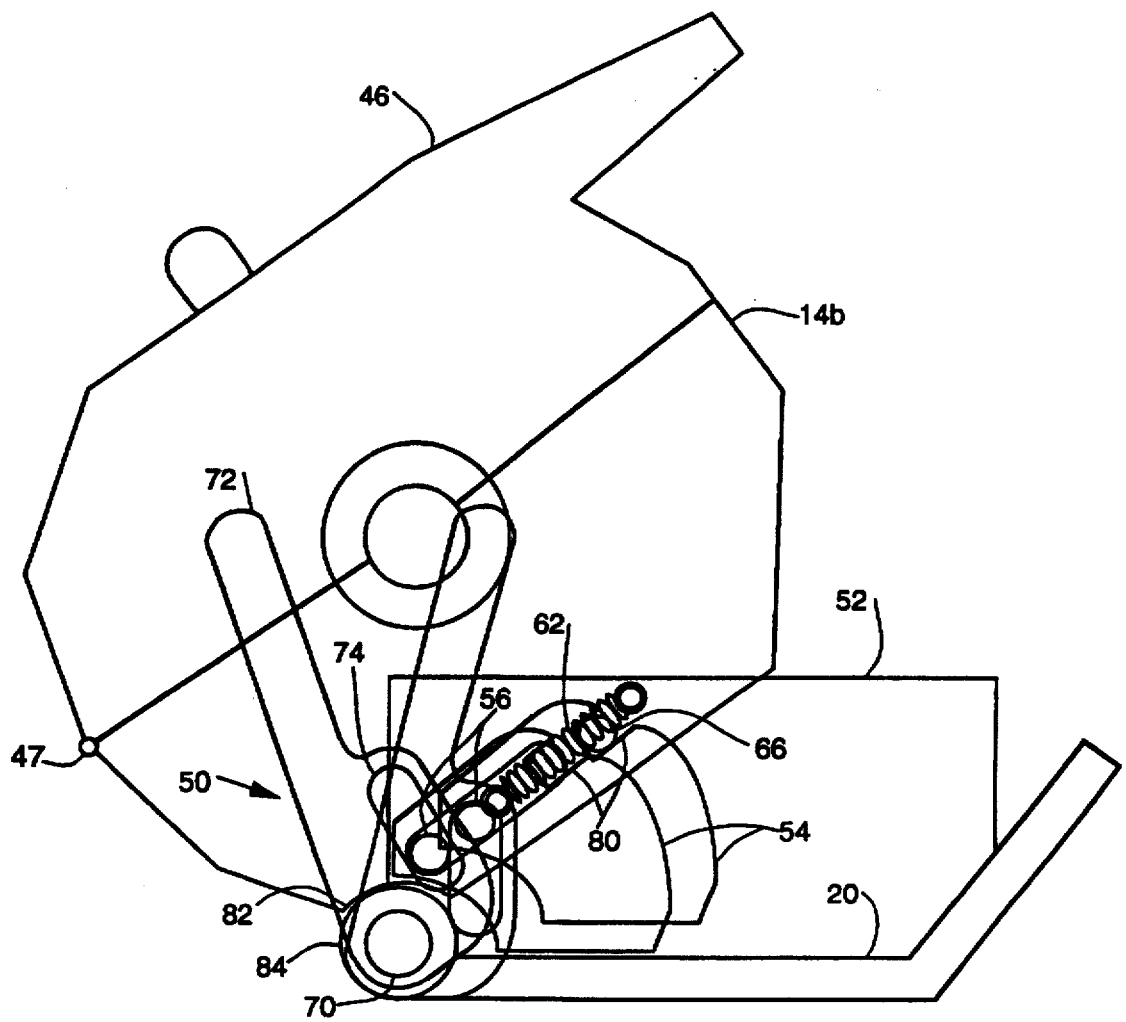
FIG. 4 is an illustrative side view of the media supply in FIG. 3 rotated to an intermediate position with respect to the support tray and secured by the locking mechanism.

Referring to FIGS. 3 and 4, the locking mechanism 50 on the lower support tray 20 is provided with an intermediate position which supports the supply cassette 14b in a rotated position relative to the support tray 20, to facilitate supply roll replacement. The sliding member 54 has a recess 80 for receiving the locking pin 66 when the cassette 14b is rotated approximately forty degrees from the horizontal position to the intermediate position. The cassette bottom has a semi-cylindrical, longitudinal recess 82 which receives the front lip 84 of the lower support tray 20. The front lip 84 has a rounded shape which cooperates with the recess 82 of the cassette bottom, acting as a detachable hinge and allowing for supported rotation of the cassette with respect to the support tray. A substantial amount of the weight of the supply cassette bears against the front lip 84 of the support tray during rotation, enabling easily manipulation by an operator. The rounded front lip 84 further prevents the cassette 14b from sliding horizontally off the support tray 20.

To support the supply cassette for roll replacement, the lever 72 is rotated downward about the axis of the bore 70 (counterclockwise in FIG. 4), the sliding member 54 is retracted against the force of the spring 62 by engagement of the pin 56 in the lever slot 74. The cassette 14b is manually rotated about the front lip 84 of the support tray 20 causing the locking pin 66 to pass around the edge of the retracted sliding member 54. When the locking pin 66 is aligned with the recess 80, the lever 72 is released and the sliding member 54 is pulled back by the spring 62, securing the locking pin 66 in the recess 80 and locking the cassette 14b into the intermediate position. With the angled intermediate position, an operator can open the lid 46 of the supply cassette 14b for easy supply roll replacement while the supply cassette 14b remains secured to the lower support tray 20.

To remove the supply cassette 14b from the lower support tray 20 without requiring an operator to manually lift the supply cassette downward to an be pivoted downward to retract the sliding member 54 and release the locking pin 66 from the sliding member 54. The cassette is then manually rotated with the weight of the cassette 14b bearing on the front lip 84 of the lower support tray 20 approximately ninety degrees from the horizontal docking position, or approximately fifty degrees from the intermediate position described above, at which point the locking pin 66 clears the sliding member 54 and the cassette is disengaged from the locking mechanism 50 completely. The lever 72 is then released, and the cassette 14b is rolled onto its backside onto a roll-up table or other suitable support means (not shown).

To return the cassette from the table to the lower support tray 20, the grooved portion 82 on the bottom of the cassette 14b is positioned against the front lip 84 of the lower support tray 20 by manual maneuvering of the roll-up table. The lever 72 is pulled downward to retract the sliding member 54 while the cassette 14b is rotated approximately ninety degrees into the lower support tray 20 from the table. The lever 72 is then released by the operator, actuating the locking mechanism 50 by engaging the locking pin 66 with the sliding member 54, thereby securing the cassette 14b within the support tray 20. The tray 20 can then be returned to the operational position as shown in FIG. 1, by sliding the lower support tray into the docking location. Engagement of the spindle ends 36b (FIG. 2) in the positioning guides 32b aligns the supply cassette 14b with respect to the feed rollers 26b, 26c.

Figure 5:
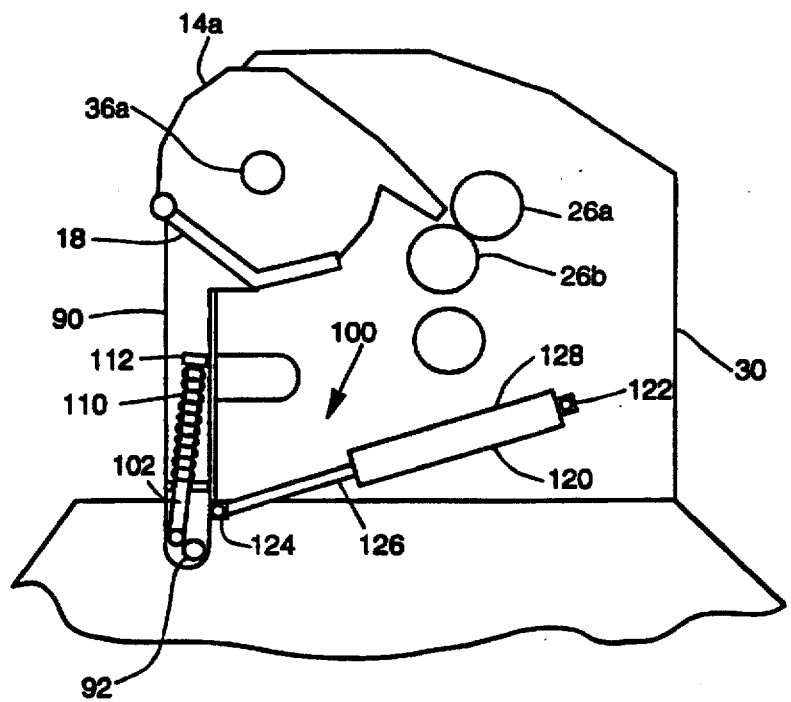
FIG. 5 is an illustrative side view of a pivotable support arm of the media supply cassette positioning system positioning an upper supply cassette according to the invention.
Figure 6:
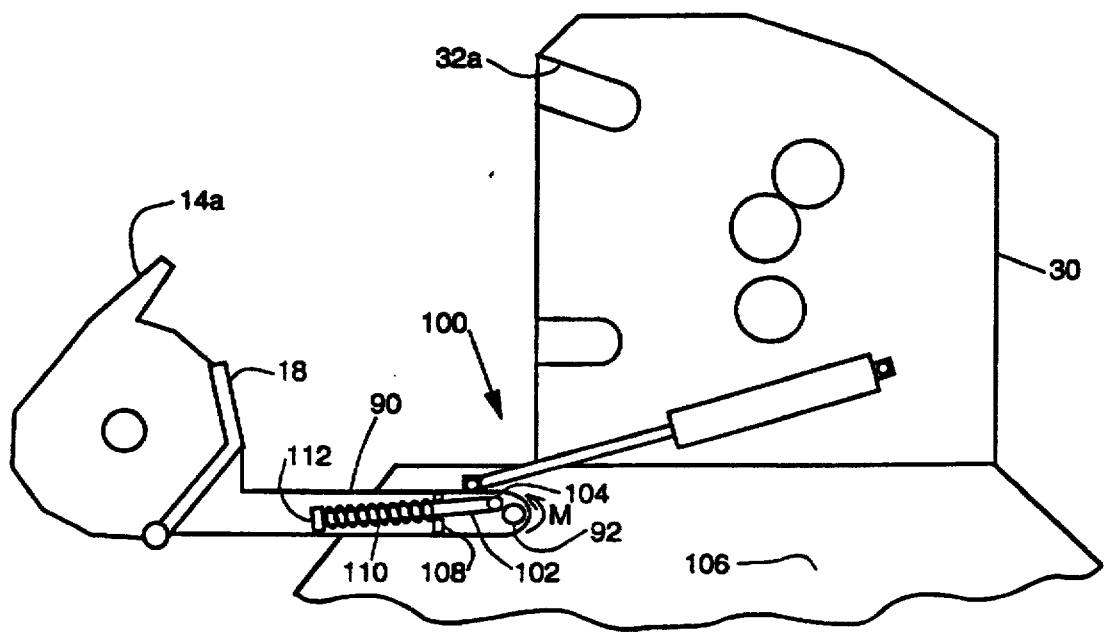
FIG. 6 is an illustrative side view of the support arm in FIG. 5 positioning the upper supply cassette into an access position and a counterbalancing mechanism according to the invention.

Referring to FIGS. 5 and 6, the upper support tray 18 and cassette 14a are shown in the docked position. The docked position has the supply cassette 14a positioned at the feed rollers 26a, 26b for extracting the media from the supply cassette and advancing it onto the scanning support surface. The ends of the spindle 36a protrude from the supply cassette 14a and cooperate with and are received in the positioning guides 32a to position the cassette 14a with respect to the feed rollers 26a, 26b. The upper support tray 18 and cassette 14a are angled downward when in the docked position relative to the horizontal docking position of the lower support tray 20 and cassette 14b. The upper support tray 18 is fixed to a support arm 90 which is pivotable about a pivot pin 92. When the upper support tray 18 is in the docked position, the pivotable support arm 90 is generally vertical and the upper support tray 18 is angled downward toward the feed rollers 26a, 26b. The supply cassette 14a is secured to the upper tray by a locking mechanism as described with reference to the lower support tray and cassette.

When the support arm 90 is pivoted approximately ninety degrees about pivot pin 92, as in FIG. 6, the upper tray 18 and supply cassette 14a are in the access position. The upper tray 18 is lowered considerably to about the same position as the lower support tray 20 when pulled out to the access position. The upper support tray 18 and cassette 14a are already positioned for reloading without the need for rotation of the cassette 14a relative to the support tray 18. The cassette 14a is angled upward about forty degrees from the horizontal position, which is generally the same orientation as the supply cassette 14b located in the lower support tray 20 when rotated to the intermediate position of the locking mechanism 50. The support arm 90 facilitates reloading of the supply roll of media while the cassette 14a remains secured to the support tray 18 via the locking mechanism, shown in FIGS. 3 and 4, as previously described with regard to the lower supply cassette. It should be noted that since the supply cassette 14a is already positioned for reloading when the support arm 90 is horizontal, the locking mechanism on the upper support tray does not require the intermediate position as described with respect to the lower support tray.

The pivotable support arm 90 for the upper support tray 18 has a counterbalancing mechanism 100 to assist the operator with positioning the supply cassette 14a between the upper docking location and the access position. A pivotable rod 102 mounted inside of the support arm 90 pivots about pivot pin 104 as the support arm 90 pivots about pivot pin 92. The pivot pins 92, 104 are fixed to the imagesetter frame 106 and the rod 102 is allowed to pivot inside the arm 90 to effect a change in the relative distance between the pivot point 104 and a flange 108 fixed to the inside of the arm 90. The distance between the pivot pin 104 and the flange 108 is largest when the support arm 90 is horizontal. A compression spring 110 is coiled around the rod 102 and is compressed between the flange 108 and a stop 112 on the end of the rod 102. Upon pivotal movement of the support arm 90 about pivot pin 92 from the vertical position toward the horizontal position, the distance between the pivot pin 104 and the flange 108 increases, thereby increasing the compression of the spring 110 and creating a force F in the direction of the pivot pin 104 that counterbalances the moment M around pivot pin 92 caused by the weight of the supply cassette 14a. The supply cassette can have a weight ranging from approximately 15 pounds when empty and constructed of structural foam plus the spindle, to about 60 pounds when full of large format media 36" wide and constructed of cast aluminum plus the spindle, for example. Consequently, the compression spring 110 has a relatively large spring constant, k, to create a force, F, large enough to counterbalance the heaviest supply cassette supported by the pivoting support arm 90. The force F created by the spring 110 during pivoting of the arm 90 from the vertical position to the horizontal position is directly proportional to the amount the spring is compressed along the rod 102. Therefore, regardless of the weight supported by the support arm 90, the counterbalance force is determined by the position of the support arm. As a result, for lighter loads the counterbalancing mechanism force can pull the support arm back to the upright position undesirably.

The preferred embodiment of the invention includes a damping mechanism such as a hydraulic damper 120 mounted on each end of the support arm 90. The damper viewed in FIGS. 5 and 6 is attached to the support plate 30 at pivot pin 122 and to the support arm at pivot pin 124. The damper 120 has a plunger rod 126 mounted telescopically relative to a cylinder 128 which is filled with a damping fluid. The plunger rod 126 moves telescopically within the cylinder 128 during pivotal movement of the support arm 90. The damper 120 resists the counterbalance force when light loads are being supported on the upper support tray 18 and prevents the support arm 90 from swinging back up to the vertical position. For heavy loads, the damper 120 prevents the support arm 90 from pivoting too quickly from the vertical position to the horizontal position under the weight of the supply cassette 14a. It will be appreciated that other suitable damping mechanisms may be substituted for the hydraulic damper.

To remove the supply cassette from the upper support tray without manually lifting the supply cassette, the locking mechanism is released and the cassette is rotated by the imagesetter operator with the weight of the supply cassette bearing on the front lip of the supply tray. The rotation of the cassette with respect to the support tray is supported by the front lip and is manipulated with little effort by the operator. The cassette is rotated approximately fifty degrees until the cassette separates from the supply tray at the detachable hinge, as described previously for the lower support tray and supply cassette. The cassette can be released onto a roll-up table or another suitable support means.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What I claim and desire to secure by Letters of Patent of the United States are the following:

1. An imagesetting device comprising:
    a media supply cassette for supporting a roll of image recording media;
    a media supporting surface for supporting the media from the supply cassette;
    an image scanning apparatus for scanning an image onto the media supported by the media supporting surface;
    a movable support tray movable between a first position and a second position, for supporting said media supply cassette at the first and second positions and for moving said media supply cassette therebetween with minimal effort from an operator, wherein the first position is an operational position in which the media can be withdrawn from said media supply cassettes to be supported by said media supporting surface and scanned by said image scanning apparatus, and wherein the second position is a non-operational access position; and,
    an adjustable locking mechanism for securing said media supply cassette in an operating position, and for securing said media supply cassette in a first orientation for facilitating replacement of said supply roll and in a second orientation for facilitating removal of said cassette onto a portable support surface without requiring the operator to manually lift the cassette, in which said media supply cassette can be reloaded with a new roll of image recording media while said media supply cassette is facilitated in said first orientation, and in which said media supply cassette can be removed from said movable support means while said media supply cassette is facilitated in said second orientation.

2. The device according to claim 1, wherein said movable support tray moves said media supply cassette between the first position and the second position while the media supply cassette is in a fixed position with respect to said movable support tray.

3. The device according to claim 2, wherein said movable support tray moves linearly between the first position and the second position.

4. The device according to claim 2, wherein said movable support tray moves non-linearly between the first position and the second position.

5. The device according to claim 1, wherein said movable support tray includes a counterbalancing mechanism for counterbalancing the weight of said media supply cassette during movement between said first and second positions to assist the imagesetter operator and ease manipulation of said media supply cassette.

6. The device according to claim 1, wherein said movable support tray includes a damping mechanism for damping the movement of the movable support tray between said first and second positions.

7. An imagesetter having a media supply cassette positioning apparatus, comprising:
    a media supporting surface for supporting media from a media supply cassette located within the imagesetter;
    an image scanning apparatus for scanning an image onto the media supported by the media supporting surface;
    a first media supply cassette containing a first roll of image recording media;
    a second media supply cassette containing a second roll of image recording media;
    a first movable support tray for supporting said first media supply cassette, said first movable support tray movable between a first position and a second position, the first position supports the first media supply cassette in an optional position in which the media is drawn from said first roll of image recording media to the media supporting surface, and the second position supports the first media supply cassette in a non-operating access position;
    a second movable support tray for supporting said second media supply cassette, said second movable support tray movable between a first position and a second position, the first position supports the second media supply cassette in an operating position in which the media is drawn from said second roll of image recording media to the media supporting surface, and the second position supports the second media supply cassette, in a non-operating access position; and,
    first and second adjustable locking mechanisms for securing said first and second media supply cassette onto said first and second movable support trays in an operating position, and for securing said first and second media supply cassettes in a first orientation for facilitating replacement of said first and second rolls of recording media and in a second orientation for facilitating removal of said first and second cassettes onto a portable support surface without requiring an operator to manually lift the cassette, in which said first and second media supply cassettes can be reloaded with new rolls of image recording media while said first and second media supply cassettes are facilitated in said first orientation, and in which said first and second media supply cassettes can be removed from said movable support means while said first and second media supply cassette are facilitated in said second orientation.

8. The apparatus according to claim 7 wherein at least one of the first and second movable support trays moves between the first position and the second position non-linearly.

9. The apparatus according to claim 7 wherein at least one of the first and second movable support trays includes a counterbalancing mechanism for counterbalancing the movable support tray while moving the media supply cassette between the first and second position.

10. The apparatus according to claim 9, wherein the at least one of said first and second movable support trays having said counterbalancing mechanism includes a damping mechanism for damping the motion between the first and second position.

11. A supply cassette positioning apparatus, comprising: a first supply cassette containing a first roll of web material;
    a second supply cassette containing a second roll of web material;
    a first movable support tray for supporting said first supply cassette, said first movable support tray movable between a first position and a second position, the first position supporting the first supply cassette in an operational position in which the material is drawn from said first roll of web material, and the second position supporting the first supply cassette in an access position;

a second movable support tray for supporting said second supply cassette, said second movable support tray movable between a first position and a second position, the first position supporting the second supply cassette in an operating position in which the material is drawn from said second roll of web material, and the second position supporting the second supply cassette in an access position; and, first and second adjustable locking mechanisms for securing said first and second media supply cassettes onto said first and second movable support trays in an operating position, and for securing said first and second media supply cassettes in a first orientation for facilitating replacement of said first and second rolls of recording media and in a second orientation for facilitating removal of said first and second cassettes onto a portable support surface without requiring an operator to manually lift the cassette, in which said first and second media supply cassettes can be reloaded with new rolls of web material while said first and second media supply cassettes are facilitated in said first orientation, and in which said first and second media supply cassettes can be removed from said movable support means while said first and second media supply cassettes are facilitated in said second orientation.

12. The apparatus according to claim 11 wherein at least one of the first and second movable support trays moves between the first position and the second position non-linearly.

13. The apparatus according to claim 11 wherein at least one of the first and second movable support trays includes a counterbalancing mechanism for counterbalancing the movable support tray while moving the media supply cassette between the first and second position.

14. The apparatus according to claim 13, wherein the at least one of said first and second movable support trays having said counterbalancing mechanism includes a damping mechanism for damping the motion between the first and second position.

15. A method for installation, removal and reloading of a media supply cassette in an imagesetter wherein the media supply cassette contains a media supply roll and the media supply cassette is supported by a movable support which has two functional positions in the imagesetter, an operational position in which the media supply cassette supplies media to the imagesetter, and an access position in which the media supply cassette is easily accessible for reloading the media supply cassette with a media supply roll, or for installing and removing the media supply cassette to and from the movable support respectively, comprising the steps of:

a. presenting the media supply cassette supported by a portable table to the movable support in the imagesetter while the movable support is in the access position;

b. securing the media supply cassette to the movable support with a locking mechanism;

c. orienting and securing the media supply cassette for operation and positioning the movable support from the access position to the operating position with the media supply cassette secured to the movable support;

d. supplying media from the media supply roll contained in the media supply cassette to the imagesetter.

e. positioning the movable support from the operational position to the access position with the media supply cassette secured to the movable support;

f. positioning and locking the media supply cassette in an intermediate position which facilitates replacement of the supply roll; and g. reloading the media supply cassette with a new media supply roll while the media supply cassette is secured to the movable support in the access position.

16. The method according to claim 15, further comprising the steps of:

e. positioning the movable support from the operational position to the access position with the media supply cassette secured to the movable support; and, f. releasing the locking mechanism and removing the media supply cassette from the movable support onto a portable support without requiring an operator to manually lift the cassette.

17. The method according to claim 15, wherein the step of positioning the movable support includes moving the movable support between the access position and the operational position in a pivotal motion and counterbalancing the pivotal motion of the movable support.

18. The method according to claim 15, further including damping the pivotal motion of the movable support to accommodate for varying loads on the movable support.

19. The method according to claim 15, wherein the step of positioning the movable support includes moving the movable support between the access position and the operational position in a linear motion.

* * * * *